United States Patent
Miyazaki

(10) Patent No.: US 10,809,715 B2
(45) Date of Patent: Oct. 20, 2020

(54) APPARATUS, ROBOT, METHOD, AND RECORDING MEDIUM

(71) Applicant: Panasonic Intellectual Property Management Co., Ltd., Osaka (JP)

(72) Inventor: Ryouta Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 198 days.

(21) Appl. No.: 16/169,024

(22) Filed: Oct. 24, 2018

(65) Prior Publication Data
US 2019/0265692 A1 Aug. 29, 2019

(30) Foreign Application Priority Data
Feb. 28, 2018 (JP) .................................. 2018-035054

(51) Int. Cl.
| | |
|---|---|
| *G05D 1/00* | (2006.01) |
| *G05D 1/02* | (2020.01) |
| *G06F 3/16* | (2006.01) |

(52) U.S. Cl.
CPC ......... *G05D 1/0033* (2013.01); *G05D 1/0088* (2013.01); *G05D 1/0246* (2013.01); *G06F 3/167* (2013.01); *G05D 2201/0214* (2013.01); *G05D 2201/0217* (2013.01)

(58) Field of Classification Search
CPC .. G05D 1/0033; G05D 1/0246; G05D 1/0088; G05D 2201/0214; G05D 2201/0217; G05D 1/0011; B25J 11/0005
See application file for complete search history.

(56) References Cited

U.S. PATENT DOCUMENTS

2019/0189088 A1* 6/2019 Saito ...................... G06F 3/0481
2019/0212728 A1* 7/2019 Tahara ....................... A63F 9/24

FOREIGN PATENT DOCUMENTS

JP 2009-131914 6/2009

* cited by examiner

*Primary Examiner* — Anne Marie Antonucci
(74) *Attorney, Agent, or Firm* — Greenblum & Bernstein, P.L.C.

(57) ABSTRACT

When an application of an apparatus is remotely activated based on an instruction by a first user, whether a current position of the apparatus is included in a blind area of a second user is determined based on an image acquired by a camera. When the current position of the apparatus is not in the blind area, a target point included in the blind area is set, a driving mechanism is controlled, the apparatus is moved to the target point, and a speaker is caused to output speech corresponding to the application.

9 Claims, 5 Drawing Sheets

APPARATUS, ROBOT, METHOD, AND RECORDING MEDIUM

BACKGROUND

1. Technical Field

The present disclosure relates to a remotely controllable apparatus and the like.

2. Description of the Related Art

Conventionally, a method of remotely controlling various robots has been offered. For example, Japanese Unexamined Patent Application Publication No. 2009-131914 discloses a robot control system in which in order to reduce the number of times of remote control by an operator as much as possible, a database is constructed based on history information of the operation of the robot at the time of remote control, the conversation situation between a robot and a person in communication with the robot is detected, the database corresponding to the detected conversation situation is referred, and the robot is made to perform a behavior relating to a conversation by autonomous control based on the referred database.

SUMMARY

However, in Japanese Unexamined Patent Application Publication No. 2009-131914, no measures are taken to prevent an instruction to the robot by an operator of the robot from being perceived by a person to communicate with a robot, so that further improvement is required.

In one general aspect, the techniques disclosed here feature an apparatus for communicating with a user. The apparatus includes a camera that acquires an image around the apparatus, a driving mechanism that drives the apparatus, a speaker, a memory, and a processor, wherein when an application of the apparatus is remotely activated based on an instruction by a first user, the processor determines, based on the image, whether a current position of the apparatus is included in a blind area of a second user, wherein the blind area does not include a line-of-sight direction of the second user, and is an area interposed by a second half straight line obtained by moving a first half straight line by a predetermined angle in a clockwise direction with respect to the first half straight line which is obtained by extending, from a position of the second user, a line segment connecting a position of the first user and the position of the second user in a direction opposite to the position of the first user and a third half straight line obtained by moving the first half straight line by a predetermined angle in a counterclockwise direction with respect to the first half straight line, sets a target point included in the blind area when it is determined that the current position of the apparatus is not included in the blind area, controls the driving mechanism to move the apparatus to the target point, and causes the speaker to output a speech corresponding to the application. These general and specific aspects may be used by a computer program, and any combination of systems, methods, and computer programs.

According to the present disclosure, it is possible to prevent an instruction to an apparatus by a first user from being perceived by a second user.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
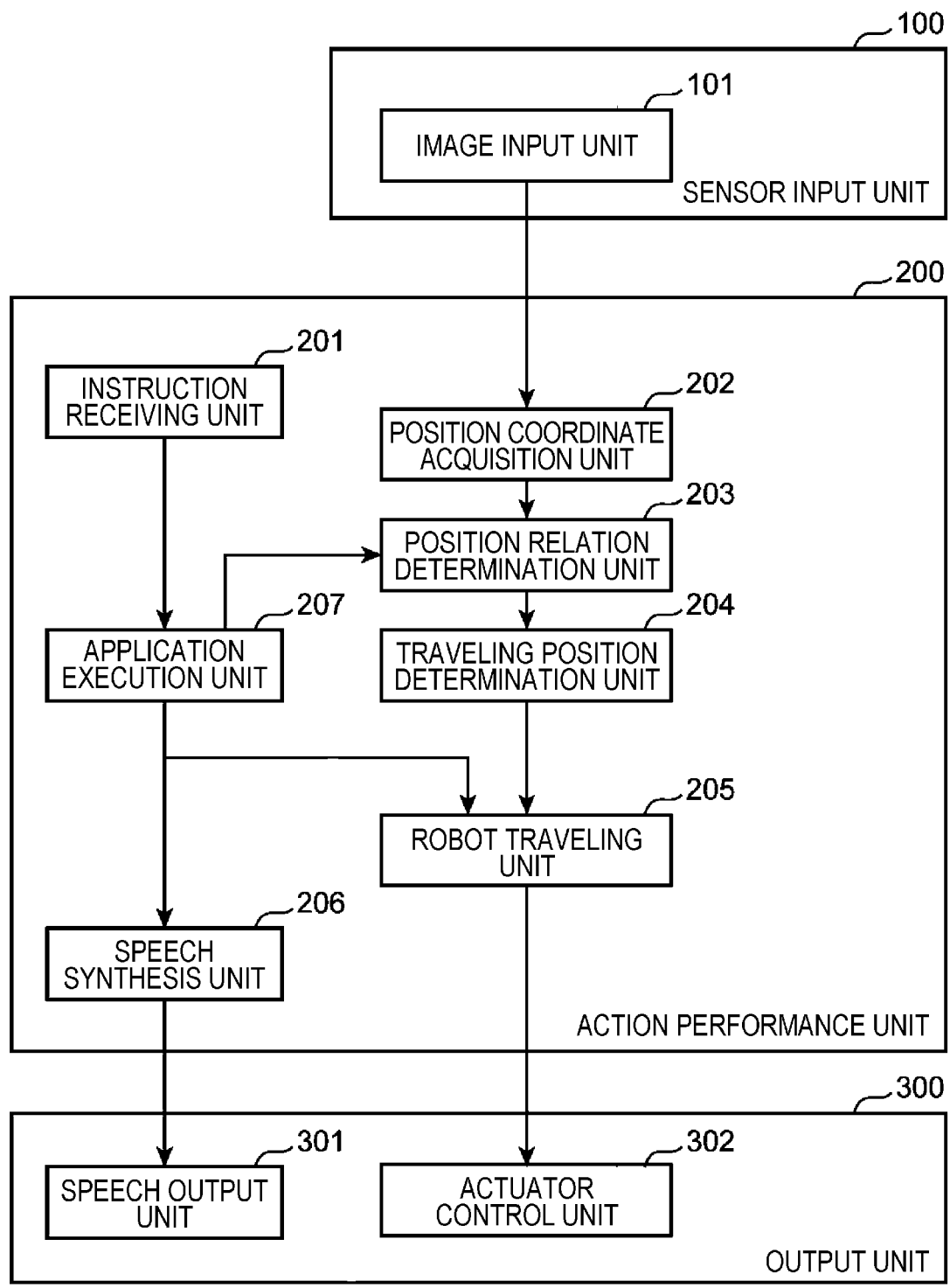
FIG. 1 is a diagram showing an example of a configuration of a robot on which an apparatus according to an embodiment of the present disclosure is mounted.

[Underlying Knowledge Forming Basis of the Present Disclosure]

The present inventor has been conducting research on a robot that supports discipline of a child by his or her guardian such as a mother. The content of support for discipline includes, for example, making a robot make a speech to deliver a message prompting a child to organize a room or study, or letting a robot read a picture book for a child. In a case where a robot is made to take such action, it is necessary for a guardian to, for example, take a mobile terminal such as a smartphone and input an activation instruction of an application for causing the robot to take such action.

However, as the guardian take the smartphones as a matter of course and enter an activation instruction, the interest of the child is directed to his or her action. Thus, there is a problem in that the child will understand that the action of the robot is based on the instruction by the guardian. This may not only give the child a sense of chill, but also cause the child to have a spirit of rebellion against the guardian. Thus, sufficient effects on the discipline may not be expected.

In the above-mentioned Japanese Unexamined Patent Application Publication No. 2009-131914, since an operator operates a terminal device connected to a robot via a network, a person who talks with the robot is in a remote place and is not in an environment where the person can see the operator's operation. Therefore, the above problem cannot occur in Japanese Unexamined Patent Application Publication No. 2009-131914. Furthermore, the present inventor has recognized that the above-mentioned problem did not exist in the past.

In view of this, the inventor of the present disclosure has found that the above-mentioned problem can be solved by causing the robot to take such action as transferring the interest of a second user from a first user to the robot immediately after an instruction, when the first user, who is the operator, inputs the activation instruction of the application.

The present disclosure has been made based on such knowledge, and provides a technique capable of preventing the instruction to the robot (apparatus) by the first user from being perceived by the second user.

An apparatus according to an aspect of the present disclosure is an apparatus for communicating with a user.
The apparatus includes
a camera that acquires an image around the apparatus, a driving mechanism that drives the apparatus,
a speaker,
a memory, and
a processor,
wherein when an application of the apparatus is remotely activated based on an instruction by a first user, the processor determines, based on the image, whether a current position of the apparatus is included in a blind area of a second user, wherein the blind area does not include a line-of-sight direction of the second user, and is an area interposed by a second half straight line obtained by moving a first half straight line by a predetermined angle in a clockwise direction with respect to the first half straight line which is obtained by extending, from a position of the second user, a line segment connecting a position of the first user and the position of the second user in a direction opposite to the position of the first user and a third half straight line obtained by moving the first half straight line by a predetermined angle in a counterclockwise direction with respect to the first half straight line,
sets a target point included in the blind area when it is determined that the current position of the apparatus is not included in the blind area,
controls the driving mechanism to move the apparatus to the target point, and
causes the speaker to output a speech corresponding to the application.

According to the present configuration, in a case where the application of the apparatus is activated based on the instruction by the first user, the apparatus moves to the blind area when the apparatus is not present in the blind area of the second user. This makes it possible to move the line-of-sight of the second user from the direction in which the second user can visually recognize the first user and the direction in which the second user cannot visually recognize the first user. As a result, it is possible to transfer the interest of the second user from the first user to the apparatus, and to prevent the instruction to the apparatus by the first user from being perceived by the second user.

In the above configuration, the first user may be a guardian of the second user.

According to this configuration, it is possible to prevent the instruction to the apparatus by the guardian from being perceived by the second user.

In the above configuration, when it is determined that the current position of the apparatus is included in the blind area, the processor may cause the speaker to output a speech corresponding to the application without moving the apparatus.

According to this configuration, without moving the apparatus to the blind area, the apparatus outputs the speech, so that the interest of the second user can be transferred from the first user to the apparatus.

The present disclosure can also be implemented by a robot on which such an apparatus is mounted, a method that includes characteristic steps included in the apparatus, and a computer program that causes a computer to execute the characteristic steps. Naturally, such a computer program can be distributed via a non-transitory computer-readable recording medium such as a CD-ROM or a communication network such as the Internet.

Note that all of the embodiments described below show one specific example of the present disclosure. Numerical values, shapes, components, steps, order of steps, and the like shown in the following embodiments are merely examples and are not intended to limit the present disclosure. In addition, among constituent elements in the following embodiments, constituent elements not described in the independent claims showing the top level concept are described as optional constituent elements. In addition, in all the embodiments, the content of each embodiment can be combined.

EMBODIMENTS

[Overall Structure]
FIG. 1 is a diagram showing an example of a configuration of a robot according to an embodiment of the present disclosure. The robot shown in FIG. 1 includes a sensor input unit 100, an action performance unit 200, and an output unit 300.

The sensor input unit 100 includes an image input unit 101. The image input unit 101 is constituted by a camera that acquires images around the robot. Here, the image input unit 101 may be constituted by an omnidirectional camera capable of acquiring images of a 360-degree orientation with respect to the robot, or may be constituted by an ordinary camera capable of acquiring images in a predetermined angle of view range. In the present disclosure, the image input unit 101 acquires images around the robot, for example, at a predetermined frame rate (for example, 60 frames per second). Note that the image input unit 101 may be constituted by a stereo camera or a depth camera capable of measuring a distance to an object located in the surroundings, for example. The depth camera measures the time until the infrared light emitted to the surroundings reflects back to the object, so that the camera can detect the distance to an object for each of a plurality of pixels.

The action performance unit 200 includes an instruction receiving unit 201, a position coordinate acquisition unit 202, a position relation determination unit 203, a traveling position determination unit 204, a robot traveling unit 205, a speech synthesis unit 206, and an application execution unit 207.

The elements constituting the action performance unit 200 are implemented, for example, by a processor such as a CPU executing a program that executes action processing. The program for executing the action processing is stored in a memory incorporated in the robot or in a memory incorporated in the terminal communicably connected to the robot, and is executed by the processor. In addition, all the elements constituting the action performance unit 200 may be mounted on the same robot or the same terminal. Alternatively, all the elements constituting the action performance unit 200 are individually mounted on another terminal or server connected via any network using such as optical fiber, radio, and public telephone line, and implemented by the communication. In addition, part of the elements of the action performance unit 200 may be mounted on the robot, and the remaining elements may be mounted on the server.

The instruction receiving unit 201 includes a communication circuit for communicating with a mobile terminal carried by the first user who remotely operates the robot and a processor for controlling the communication circuit, and receives an instruction to the robot by the first user. In the present disclosure, the instruction receiving unit 201 receives an instruction to the robot by the first user when the first user performs an activation instruction of an application that supports the discipline of the second user and the application is performed. Here, for example, the first user corresponds to a guardian of the second user (for example, a mother, a father, a grandparent or the like), and the second user corresponds to a child. In addition, in the present disclosure, the child is assumed to be, especially, an infant.

The application that support discipline includes an application that causes a robot to perform an action to make a child acquire predetermined lifestyle habits, for example, to prompt a child to organize a room. Here, when the robot makes a speech such as "Organize the room" all of a sudden, the second user may have a spirit of rebellion.

Therefore, the application that supports discipline is not simply an application that causes the robot to make a speech instructing organization of the room. The application can be employed in which after attracting the interest of the second user sufficiently to the robot, the robot is caused to deliver a message prompting organization of the room. Specifically, the application can make the robot take the following actions. First, the robot gives a quiz or has a small talk to the second user in order to attract the interest of the second user to the robot. Then, the robot speaks to the second user, urging the second user to organize the room. In addition, the robot delivers a message encouraging the second user during an organization work by the second user. When the organization work is completed, the robot delivers a complimentary message to the second user.

Examples of the mobile terminal possessed by the first user may include a smartphone, a tablet, or a mobile phone. Note that the first user may input an activation instruction of the application by using a stationary personal computer instead of the mobile terminal. In addition, the mobile terminal and the robot are communicably connected to each other via radio, such as Wifi (registered trademark) or Bluetooth (registered trademark). However, this is only an example, and the mobile terminal and the robot may be connected by wire.

The position coordinate acquisition unit 202 receives image data from the image input unit 101, extracts feature quantity from the image data, estimates the self position of the robot from the extracted feature quantity, and constructs an environment map around the robot. In addition, the position coordinate acquisition unit 202 extracts the first user and the second user from the image data, and estimates the positions of the extracted first user and second user.

In an unknown environment, an SLAM (Simultaneous Localization and Mapping) is known as a technique for generating an environment map while estimating its own position. Therefore, the position coordinate acquisition unit 202 can estimate the self position, estimate the positions of the first user and the second user, and construct the environment map using the SLAM.

Note that the SLAM can be applied to any image data acquired by a monocular camera, a depth camera, or a stereo camera. Therefore, the position coordinate acquisition unit 202 can estimate the self position using the SLAM whichever camera the image input unit 101 is constituted by among the monocular camera, the depth camera and the stereo camera.

In the present disclosure, the environment map is composed of two-dimensional map data consisting of two axes of length×width when the robot is viewed from directly above. Therefore, the self-position of the robot, the positions of the first user and the second user are composed of two-dimensional coordinate data. However, this is only an example, and the environment map may be composed of three-dimensional map data consisting of three axes of length×width×height. In this case, the self-position of the robot, the positions of the first user and the second user are composed of three-dimensional coordinate data.

In addition, the position coordinate acquisition unit 202 compares the feature quantity of the first user and the second user, which are stored in the memory in advance, with the image data, thereby to be able to extract the first user and the second user from the image data, and may estimate the positions of the first user and the second user from the coordinate data in the extracted image data. Examples of the feature quantity of the first user and the second user may include the feature quantity of the faces and the feature quantity of the body shapes of the first user and the second user.

When the application is activated by the application execution unit 207, the position relation determination unit 203 determines whether the robot is positioned in the blind area of the second user.

Figure 4:
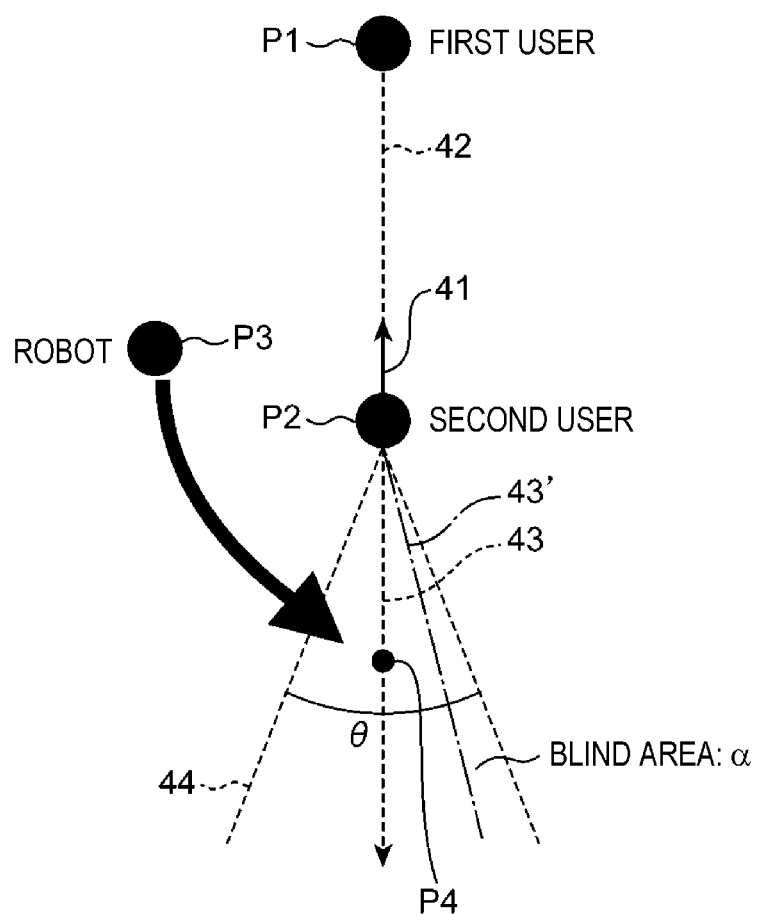
FIG. 4 is a diagram showing an example of a blind area.

FIG. 4 is a diagram showing an example of the blind area α. The blind area α does not include a line-of-sight direction 41 of the second user, and is a fan-shaped area interposed by a second half straight line 44 obtained by moving a first half straight line 43 by a predetermined angle θ/2 in a clockwise direction with respect to the first half straight line 43 which is obtained by extending, from the position P2 of the second user, a line segment 42 connecting a position P1 of the first user and a position P2 of the second user in a direction opposite to the position P1 of the first user and a third half straight line 45 obtained by moving the first half straight line 43 by a predetermined angle θ/2 in a counterclockwise direction with respect to the first half straight line 43.

Here, the blind area α is an area opposite to the first user with respect to the position P2. When the line-of-sight of the second user located at the position P2 is within the blind area α, the blind area α is an area where the first user is out of the field of view of the second user. Therefore, the predetermined angle θ formed by the second half straight line 44 and the third half straight line 45 can be an angle at which the first user is not seen in the field of view of the second user located at the position P2. For example, the angles of 30 degrees, 45 degrees, 60 degrees, and the like can be employed.

Specifically, when the instruction receiving unit 201 receives an activation instruction of the application, the position relation determination unit 203 plots a current position P3 of the robot acquired by the position coordinate acquisition unit 202, the position P1 of the first user, and the position P2 of the second user on the environment map. Then, the position relation determination unit 203 sets the blind area α at the position P2 based on the plotted position P1 and position P2. Then, when the current position P3 is located outside the blind area α, the position relation determination unit 203 may determine that the robot is not located within the blind area α, and when the current position P3 is located within the blind area α, the position relation determination unit 203 may determine that the robot is located within the blind area α.

With reference to FIG. 1, when the position relation determination unit 203 determines that the robot is not located within the blind area α, the traveling position determination unit 204 sets a target position P4 of the robot in the blind area α. With reference to FIG. 4, for example, on the first half straight line 43, the target position P4 may be employed so that the second user and the robot is spaced to each other by an appropriate predetermined distance which is suitable for the communication between the robot and the second user. For example, on the first half straight line 43, the target position P4 may be a position which is away from the position P2 of the second user by a distance of 50 cm, 1 m, or 2 m. However, this is an example.

In FIG. 4, assuming that the line-of-sight direction 41 of the second user is on the line segment 42, in order to direct the line-of-sight of the second user in the direction opposite to the first user, the target position P4 is set on the first half straight line 43. However, the actual line-of-sight direction of the second user is not necessarily on the line segment 42. Therefore, when a configuration in which the actual line-of-sight direction of the second user can be detected is employed, the traveling position determination unit 204 sets a half straight line extending in the opposite direction from the position P2 with respect to the detected line-of-sight as a first half straight line 43'. As long as the first half straight line 43' is included in the blind area α, the target position P4 may be set on the first half straight line 43'. On the other hand, in a case where the first half straight line 43' is not located within the blind area α, when the target position P4 is set on the first half straight line 43', the target position P4 is located outside the blind area α, so that the traveling position determination unit 204 may set the target position P4 on the first half straight line 43.

Note that the actual line-of-sight direction of the second user may be extracted so that, for example, the position coordinate acquisition unit 202 performs the line-of-sight detection processing from the image data.

With reference to FIG. 1, the robot traveling unit 205 outputs to an actuator control unit 302 a traveling command for moving the robot to the target position P4 set by the traveling position determination unit 204. Here, the traveling command is, for example, to cause the robot to turn so that the front direction of the robot is directed to the extending direction of the first half straight line 43, and to cause the robot to travel from the current position P3 toward the target position P4.

When the instruction receiving unit 201 receives an instruction to activate the application, the application execution unit 207 activates the corresponding application. Then, the application execution unit 207 outputs to the robot traveling unit 205 a traveling command for traveling the robot as needed, and outputs to the speech synthesis unit 206 a speech command for causing the robot to make a speech.

The speech synthesis unit 206 generates speech data for causing the robot to make a speech corresponding to the speech command output from the application execution unit 207, and outputs the speech data to a speech output unit 301.

The output unit 300 includes the speech output unit 301 and the actuator control unit 302. The speech output unit 301 converts the speech data generated by the speech synthesis unit 206 into a speech signal and cause a speaker to outputs the speech signal. The actuator control unit 302 controls the actuator or the motor of the robot so that the robot moves according to the traveling command generated by the application execution unit 207 or the robot traveling unit 205.

Note that when the action performance unit 200 is mounted on a terminal connected to the robot via wireless or wired communication, and the speech output unit 301 and the actuator control unit 302 are mounted on the robot, the speech output unit 301 may receive the speech data transmitted from the speech synthesis unit 206 via wired or wireless communication. In addition, the actuator control unit 302 may receive the traveling command transmitted from the robot traveling unit 205 via wired or wireless communication.

Figure 2:
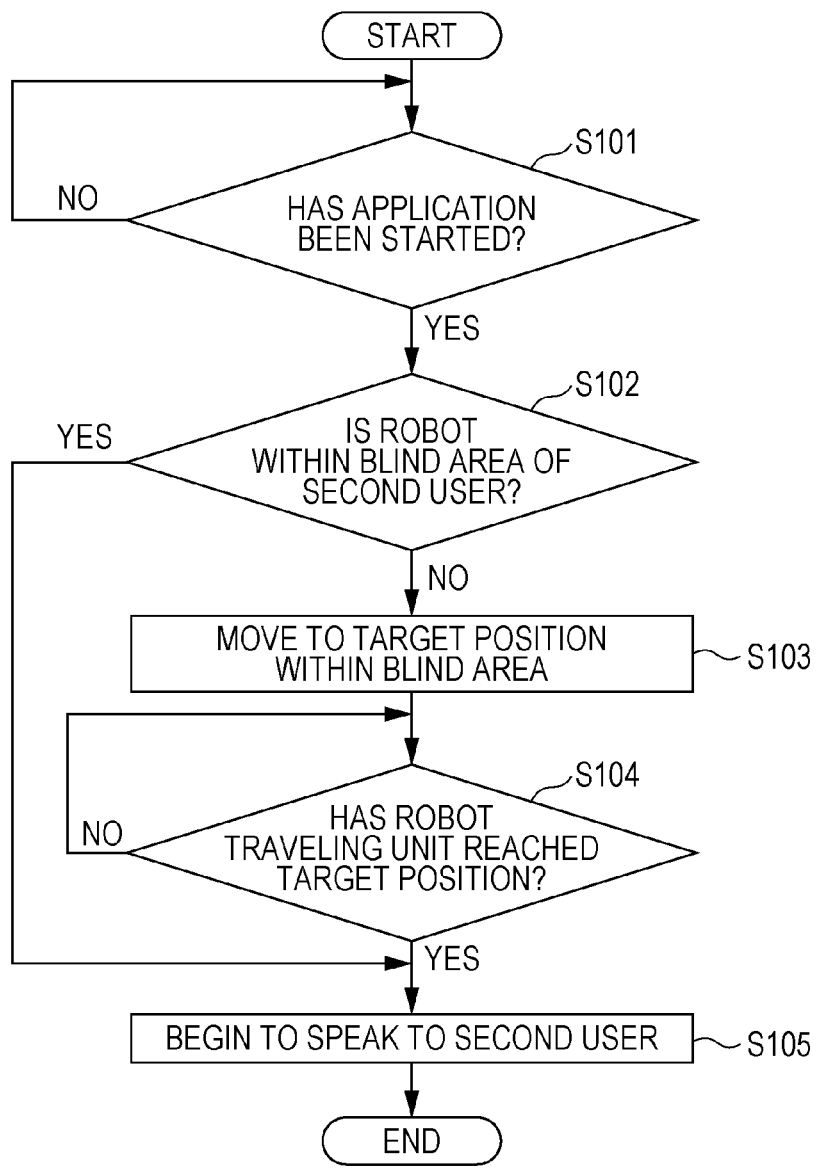
FIG. 2 is a flowchart showing an example of processing of the robot shown in FIG. 1.
Figure 3:
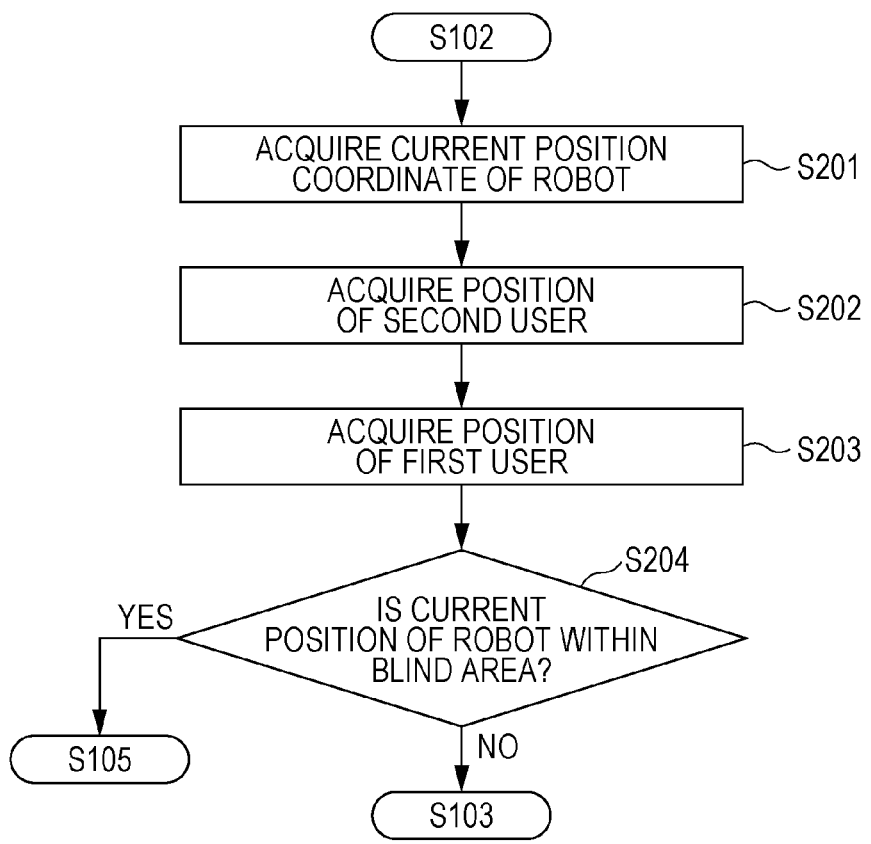
FIG. 3 is a flowchart showing the details of the process in S102 of FIG. 2.

FIG. 2 is a flowchart showing an example of processing of the robot shown in FIG. 1. FIG. 3 is a flowchart showing the details of the process in S102 of FIG. 2.

Hereinafter, with reference to FIG. 2, FIG. 3, and FIG. 4, processing when the application activates the robot will be described.

An activation instruction of the application by the first user is received by the instruction receiving unit 201, and when the application for supporting the discipline of the second user is activated by the application execution unit 207 ("YES" in S101), the position relation determination unit 203 moves the process to S102. On the other hand, when the application is not activated ("NO" in S101), the process waits at S101. Here, the activation instruction is transmitted from a mobile terminal to the robot by the first user performing an input operation on the mobile terminal carried by the first user.

In S102, as shown in FIG. 4, the position relation determination unit 203 determines whether the robot is located within the blind area α of the second user. When the robot is not located within the blind area α ("NO" in S101), the traveling position determination unit 204 sets the target position P4 of the robot within the blind area α, and the robot traveling unit 205 moves the robot to the set target position P4 (S103).

Referring to FIG. 4, the robot traveling unit 205 turns the robot so that the front direction of the robot is directed to the extending direction of the first half straight line 43, a traveling command for moving the robot from the current position P3 to the target position P4 is generated, and outputs the traveling command to the actuator control unit 302. As a result, the robot performs a turning operation so that the front direction is directed to the extending direction of the first half straight line 43, and then starts moving to the target position P4.

Next, the robot traveling unit 205 determines whether the robot has reached the target position P4 (S104). When the robot has reached the target position P4 ("YES" in S104), the application execution unit 207 causes the robot to begin to speak to the second user (S105). On the other hand, when the robot has not reached the target position P4 ("NO" in S104), the robot traveling unit 205 cause the robot to keeps moving. Here, the robot traveling unit 205 may set a variation pattern of the speed of the robot from the current position P3 to the target position P4 at the start of traveling of the robot to move the robot to the target position P4 according to the set variation pattern of the speed. Here, as a variation pattern of the speed, for example, the robot is gradually accelerated from the current position P3 to the first distance, the robot is caused to travel at a constant speed from the first distance to a second distance before the target position P4, and a pattern that gradually decelerates the robot can be employed from the second distance to the target position P4 so that the speed becomes 0 at the target position P4. As a result, the robot can be smoothly moved toward the target position P4 and at the same time the robot can be accurately stopped at the target position P4.

Next, the details of the process in S102 of FIG. 2 will be described with reference to FIG. 3. In S201, the position relation determination unit 203 acquires from the position coordinate acquisition unit 202 the coordinate data of the current position P3 of the robot calculated from the image data by the position coordinate acquisition unit 202. In S202, the position relation determination unit 203 acquires from the position coordinate acquisition unit 202 the coordinate data of the position P2 of the second user calculated from the image data by the position coordinate acquisition unit 202. In S203, the position relation determination unit 203 acquires the coordinate data of the position P1 of the first user calculated from the image data by the position coordinate acquisition unit 202.

In S204, the position relation determination unit 203 plots, on the environment map constructed by the position coordinate acquisition unit 202, the position P1 of the first user, the position P2 of the second user, and the current position P3 of the robot, and sets a blind area α at a position P2. Then, the position relation determination unit 203 determines whether the current position P3 of the robot is located within the blind area α. When the robot is not located within the blind area α ("NO" at S204), the process proceeds to S103 in FIG. 2. On the other hand, when the current position P3 of the robot is located within the blind area α ("YES" in S204), the process proceeds to S105 in FIG. 2.

Next, the use case of the robot of the present disclosure will be described. The first user, the second user and the robot are in a space visible to each other (for example, the same room), and the second user is playing with a toy. The first user wants the second user to tidy the toys up, takes the first mobile terminal, and inputs an activation instruction of an application to urge children to organize the room. At this time, the second user is interested in the mobile terminal taken out by the first user and directs the line-of-sight to the first user.

A case where the robot does not exist in the blind area α of the second user and does not move to the blind area α will be studied. In this case, when the robot starts the application in accordance with the activation instruction and begins to speak to the second user, since the first user is present in the field of view of the second user, the interest of the second user remains directed to the first user, and there is a high possibility that the second user does not respond to a speech by the robot. In addition, since the second user sees the operation of the mobile terminal by the first user, there is also a high possibility that the second user may understand that the speech by the robot after the operation is made according to the instruction by the first user. In this case, the second user may have a sense of chill and a spirit of rebellion against the first user, thereby increasing the possibility that the second user does not respond to the speech by the robot.

Therefore, in the present disclosure, when an activation instruction of an application is made, when the robot is not present in the blind area α of the second user, the robot moves to the blind area α. As a result, the robot can guide the line-of-sight of the second user to the blind area α opposite to the first user. Therefore, when the first user is not present in the field of view of the second user, the interest of the second user will be soon directed from the first user to the robot. Then, in this state, since the robot begins to speak, the robot can let the second user with concentration listen to a speech by the robot. As a result, the robot can successfully guide the second user to the organization of the toys, and can smoothly support the discipline.

On the other hand, in a case where an activation instruction of the application is made, when the robot is present in the blind area α of the second user, the robot is made to speak at the place without the movement of the robot. The reason is that in a case where the robot is present in the blind area α, when the second user turns toward the robot by the speech by the robot, the first user is not present in the field of view of the second user, whereby even without moving the robot, the interest of the second user can be transferred from the first user to the robot.

[Robot]

Figure 5:
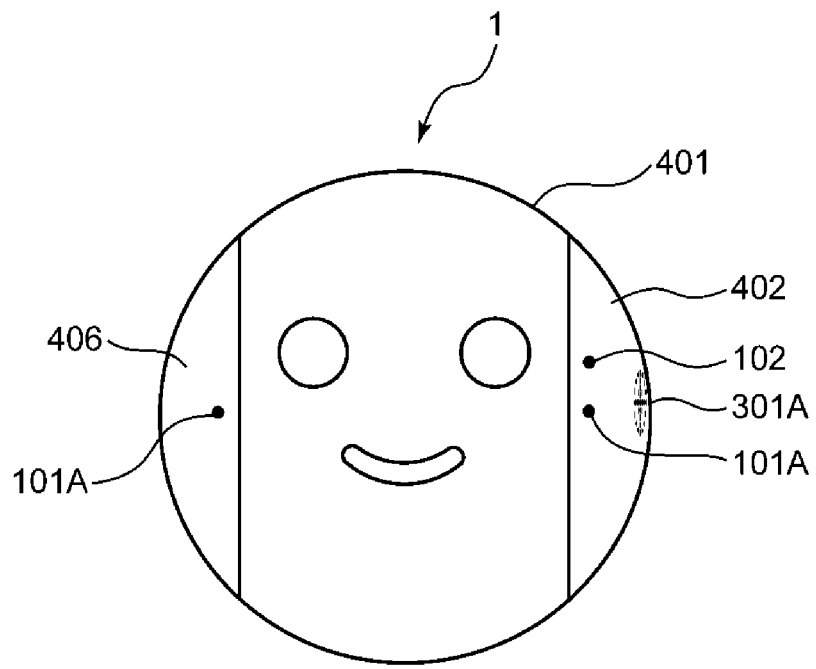
FIG. 5 is a diagram showing an example of an appearance of the robot shown in FIG. 1.

Next, the mechanical configuration of the robot shown in FIG. 1 will be described. FIG. 5 is a diagram showing an example of an appearance of a robot 1 shown in FIG. 1. As shown in FIG. 5, the robot 1 includes a spherical belt-like main housing 401, a first spherical crown 402, and a second spherical crown 406. The main housing 401, the first spherical crown 402 and the second spherical crown 406 constitutes a sphere as a whole. That is, the robot 1 has a spherical shape.

In addition, as shown in FIG. 5, the robot 1 includes a pair of cameras 101A in each of the first spherical crown 402 and the second spherical crown 406. The first spherical crown 402 is provided with a microphone 102 and a speaker 301A. The camera 101A corresponds to the image input unit 101 shown in FIG. 1. The camera 101A is provided in the first spherical crown 402 and the second spherical crown 406 so that the optical axis is directed to the front side of the robot 1, for example.

In FIG. 5, an example in which the camera 101A is constituted by a stereo camera is shown. In a case where the camera 101A is configured by a depth camera or a monocular camera, the camera 101A is provided in one of the first spherical crown 402 and the second spherical crown 406. The speaker 301A outputs the speech signal output from the speech output unit 301 shown in FIG. 1 to the external space. The microphone 102 acquires the speech around the robot 1.

Figure 6:
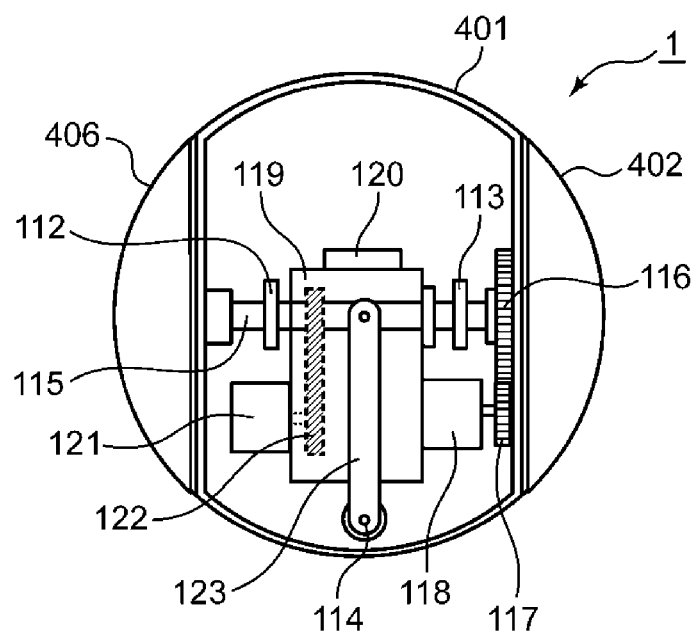
FIG. 6 is a view of the interior of the robot shown in FIG. 5 as viewed from behind.

FIG. 6 is a view of the interior of the robot 1 shown in FIG. 5 as viewed from behind. The first spherical crown 402 and the second spherical crown 406 are connected by a laterally extending shaft 115. On the other hand, the shaft 115 and the main housing 401 are not fixed.

The main housing 401 includes a fixed first gear 116, a second gear 117 engaged with the first gear 116, a motor 118 connected to the second gear 117, and a frame 119 for fixing the motor 118. Since the frame 119 is suspended from the shaft 115, the frame 119 does not rotate even when the shaft 115 rotates.

When the motor 118 is driven, the second gear 117 connected to the motor 118 rotates, and its power is transmitted to the first gear 116 engaged with the second gear 117. As a result, the main housing 401 to which the first gear 116 is fixed rotates in synchronization with the driving of the motor 118. Therefore, when the motor 118 rotates in the forward direction, the robot 1 moves forward, and when the motor 118 rotates in the rearward direction, the robot 1 moves backward.

The motor 118 is an example of an actuator and rotates under the control of the actuator control unit 302 shown in FIG. 1. As a result, the actuator control unit 302 can move the robot 1 forward or backward. The main housing 401, the first gear 116, the second gear 117, and the motor 118 are an example of a movement mechanism.

A weight 114 is attached to the frame 119 via a pair of arms 123. The pair of arms 123 holds the weight 114 at the lower ends, and the upper ends of the arms 123 are rotatably attached to the frame 119 in the roll direction of the robot 1. A motor (not shown) for swinging the pair of arms 123 in the roll direction is attached inside the frame 119. Thus, when the main housing 401 is rotated in the forward direction with the weight 114 swinging to the right as viewed from behind, the robot 1 turns to the right. On the other hand, when the main housing 401 is rotated in the forward direction with the weight 114 swinging to the left as viewed from behind, the robot 1 turns to the left. The actuator control unit 302 shown in FIG. 1 can rotate the robot 1 to the right by driving the motor 118 in the forward direction with the motor (not shown) rotated to the right by a predetermined angle. Similarly, the actuator control unit 302 can rotate the robot 1 to the left by driving the motor 118 in the forward direction with the motor (not shown) rotated to the left by a predetermined angle.

A motor 121 rotates the shaft 115. When the motor 121 rotates forward, its rotational force is transmitted to the shaft 115 via a belt 122, and the shaft 115 rotates downward in the pitch direction. On the other hand, when the motor rotates rearward, its rotational force is transmitted to the shaft 115 via the belt 122, and the shaft 115 rotates upward in the pitch direction. Therefore, the first spherical crown 402 and the second spherical crown 406 attached to the shaft 115 and a display unit displaying the eyes and the mouth of the robot 1 attached to the arm 113 rotate in conjunction. As a result, the direction of the eyes and the mouth of the robot 1 and the direction of the optical axis of the camera 101A are changed downward or upward in the pitch direction.

The present disclosure can employ the following modifications.

(1) In the above-described embodiment, the spherical shape shown in FIGS. 5 and 6 is employed as the robot. The present disclosure is not limited to this shape and the present disclosure may be applied to a robot with other shapes.

(2) Although the present disclosure is applied to the robot shown in FIG. 1, this is merely an example and may be applied to a general apparatus including a robot. The apparatus includes, for example, a home appliance such as a television or audio equipment.

(3) In the above-described embodiment, an application that supports discipline is employed. The present disclosure is not limited to this application, and for example, an application supporting overall education including discipline may be employed.

(4) A plurality of types of applications described in the above embodiment may be employed, for example, according to the contents of the discipline. In this case, the first user may select any one of the plurality of types of applications. Specifically, the robot stores a plurality of types of applications in the memory, and when the first user inputs an activation instruction of a certain type of application using the mobile terminal, the application may be activated. The content of discipline includes discipline relating to, for example, organization, cleaning, study, bathing, toilet and the like.

INDUSTRIAL APPLICABILITY

According to the present disclosure, it is useful in that the application execution instruction to the robot is not acknowledged by a user, and the user is made to believe that the robot autonomously made an action.

What is claimed is:

1. An apparatus for communicating with a user, the apparatus comprising:
   a driving mechanism that drives the apparatus,
   a speaker,
   a memory, and
   a processor,
   wherein when an application of the apparatus is remotely activated based on an instruction by a first user, the processor:
      determines, based on an image around the apparatus that is acquired by a camera, whether a current position of the apparatus is in a blind area of a second user, wherein the blind area is not in a line-of-sight direction of the second user, and is an area interposed by:
         a second half straight line obtained by moving a first half straight line by a first predetermined angle in a clockwise direction with respect to the first half straight line which is obtained by extending, from a position of the second user, a line segment connecting a position of the first user and the position of the second user in a direction opposite to the position of the first user; and
         a third half straight line obtained by moving the first half straight line by a second predetermined angle in a counterclockwise direction with respect to the first half straight line,
      sets a target point included in the blind area when the current position of the apparatus is not in the blind area,
      controls the driving mechanism to move the apparatus to the target point, and
      causes the speaker to output speech corresponding to the application.

2. The apparatus according to claim 1, wherein the first user is a guardian of the second user.

3. The apparatus according to claim 1, wherein, when the current position of the apparatus is in the blind area, the processor causes the speaker to output the speech corresponding to the application without moving the apparatus.

4. The apparatus according to claim 1, further comprising: the camera that acquires the image around the apparatus.

5. A robot, comprising:
the apparatus according to claim 1.

6. The robot according to claim 5, further comprising: the camera that acquires the image around the apparatus.

7. A method for an apparatus that communicates with a user,
wherein the apparatus comprises a processor, a speaker, and a movement mechanism,
the method comprising:
   when an application of the apparatus is remotely activated based on an instruction by a first user,
      determining, based on an image around the apparatus that is acquired by a camera, whether a current position of the apparatus is in a blind area of a second user, wherein the blind area is not in a line-of-sight direction of the second user, and is an area interposed by:
         a second half straight line obtained by moving a first half straight line by a first predetermined angle in a clockwise direction with respect to the first half straight line which is obtained by extending, from a position of the second user, a line segment connecting a position of the first user and the position of the second user in a direction opposite to the position of the first user; and
         a third half straight line obtained by moving the first half straight line by a second predetermined angle in a counterclockwise direction with respect to the first half straight line,
      setting a target point included in the blind area when the current position of the apparatus is not in the blind area,
      controlling the driving mechanism to move the apparatus to the target point, and
      causing the speaker to output speech corresponding to the application.

8. The method according to claim 7,
wherein the apparatus further comprises the camera that acquires the image around the apparatus.

9. A non-transitory computer-readable recording medium storing a program that, when executed by a processor included in an apparatus, causes the processor to perform operations comprising:
determining, based on an image around the apparatus that is acquired by a camera, whether a current position of the apparatus is in a blind area of a second user, wherein the blind area is not in a line-of-sight direction of the second user, and is an area interposed by:
a second half straight line obtained by moving a first half straight line by a first predetermined angle in a clockwise direction with respect to the first half straight line which is obtained by extending, from a position of the second user, a line segment connecting a position of a first user and the position of the second user in a direction opposite to the position of the first user; and
a third half straight line obtained by moving the first half straight line by a second predetermined angle in a counterclockwise direction with respect to the first half straight line, setting a target point included in the blind area when the current position of the apparatus is not in the blind area;
controlling a driving mechanism of the apparatus to move the apparatus to the target point; and
causing a speaker of the apparatus to output speech corresponding to the application.

* * * * *